(12) United States Patent
Hattori et al.

(10) Patent No.: US 10,118,506 B2
(45) Date of Patent: Nov. 6, 2018

(54) SLIDE RAIL

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Yuki Hattori, Aichi-ken (JP); Tomokazu Fukuda, Aichi-ken (JP); Eiji Mizutani, Aichi-ken (JP); Taro Fukuta, Aichi-ken (JP); Akira Kaneko, Aichi-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

(*) Notice: Subject to any disclaimer, the term of this patent is extended or adjusted under 35 U.S.C. 154(b) by 46 days.

(21) Appl. No.: 15/398,168

(22) Filed: Jan. 4, 2017

(65) Prior Publication Data

US 2017/0197525 A1 Jul. 13, 2017

(30) Foreign Application Priority Data

Jan. 8, 2016 (JP) ................................ 2016-002489

(51) Int. Cl.
*B60N 2/07* (2006.01)
*B60N 2/16* (2006.01)

(52) U.S. Cl.
CPC .......... *B60N 2/073* (2013.01); *B60N 2/0705* (2013.01); *B60N 2/0715* (2013.01); *B60N 2/168* (2013.01); *B60N 2/1615* (2013.01); *B60N 2/1635* (2013.01)

(58) Field of Classification Search
CPC ...... B60N 2/073; B60N 2/168; B60N 2/1635; B60N 2/0705; B60N 2/0715; B60N 2/1615

(Continued)

(56) References Cited

U.S. PATENT DOCUMENTS 4,204,658 A * 5/1980 Courtois ............. B60N 2/0705
                                              248/430
4,526,424 A * 7/1985 Korth .................. B60N 2/0707
                                              297/473

(Continued)

FOREIGN PATENT DOCUMENTS

JP        63-176753        11/1988
JP        4-57435          5/1992

(Continued)

OTHER PUBLICATIONS

Japanese Office Action for JP2016-002489 dated Oct. 24, 2017, along with English language translation thereof.

*Primary Examiner* — Jason S Morrow
*Assistant Examiner* — E Turner Hicks
(74) *Attorney, Agent, or Firm* — Greenblum & Bernstein, P.L.C.

(57) ABSTRACT

A slide rail includes a fixed-side rail, a movable-side rail, and a reinforcing structure that prevents detachment of the movable-side rail from the fixed-side rail. The reinforcing structure includes a fixed-side engaging portion attached to the fixed-side rail, and a movable-side engaging portion attached to the movable-side rail. The fixed-side and the movable-side engaging portions are configured, while allowing sliding of the movable-side rail, to come in contact with each other due to an action by a large load in a detaching direction input between the fixed-side rail and the movable-side rail, and to be engaged with each other to restrict movement of the movable-side rail in the detaching direction. A contact surface, that comes in contact with the movable-side engaging portion, of the fixed-side engaging portion includes surface regions that have mutually different positions in the detaching direction and are provided side by side in a sliding direction.

5 Claims, 8 Drawing Sheets

(58) Field of Classification Search
USPC ........... 296/65.13, 65.14, 68.1, 65.01, 65.11, 296/65.03, 65.02
See application file for complete search history.

(56) References Cited

U.S. PATENT DOCUMENTS

| | | | | |
|---|---|---|---|---|
| 4,685,716 | A * | 8/1987 | Kondo | B60R 22/26 248/429 |
| 4,818,022 | A * | 4/1989 | Nishimura | B60N 2/06 280/804 |
| 5,106,144 | A * | 4/1992 | Hayakawa | B60N 2/071 248/429 |
| 5,322,348 | A * | 6/1994 | Johnson | B60N 2/0705 248/430 |
| 5,653,506 | A * | 8/1997 | Wisner | B60N 2/0705 248/429 |
| 5,755,422 | A * | 5/1998 | Susko | B60N 2/0705 248/430 |
| 5,957,535 | A * | 9/1999 | Pasternak | B60N 2/0705 248/429 |
| 6,089,665 | A * | 7/2000 | Andrigo | B60N 2/06 248/424 |
| 9,180,796 | B2 * | 11/2015 | Markel | B60N 2/01583 |
| 9,834,116 | B2 * | 12/2017 | Couasnon | B60N 2/0722 |
| 2010/0327138 | A1 * | 12/2010 | Yamada | B60N 2/0705 248/429 |

FOREIGN PATENT DOCUMENTS

| | | |
|---|---|---|
| JP | 2010-274738 | 12/2010 |
| JP | 2015-89726 | 5/2015 |

* cited by examiner

SLIDE RAIL

INCORPORATION BY REFERENCE

The disclosure of Japanese Patent Application No. 2016-002489 filed on Jan. 8, 2016 including the specification, drawings and abstract is incorporated herein by reference in its entirety.

BACKGROUND

1. Technical Field

The disclosure relates to a slide rail. More specifically, the disclosure relates to a slide rail including a fixed-side rail that is attached to a vehicle body, a movable-side rail that is slidably attached to the fixed-side rail, and a reinforcing structure that prevents detachment of the movable-side rail from the fixed-side rail.

2. Description of Related Art

As a slide rail that slidably couples a vehicle seat to a floor, there is conventionally known one disclosed in Japanese Utility Model Application Publication No. 4-57435 (JP 4-57435 U). That is, the disclosed slide rail includes a lower rail that is attached to a floor, and an upper rail that is attached to a vehicle seat and is slidably attached to the lower rail. The slide rail further includes a reinforcing structure for preventing detachment of the upper rail from the lower rail in the event of a front collision of a vehicle.

The reinforcing structure includes an upper-side hook that is externally attached to the upper rail, and a lower-side hook that is externally attached to the lower rail. The upper-side hook is joined to an anchor bracket that is attached to the upper rail and configured to support a seat belt anchor, and extends downward. The lower-side hook serves as an underlay of the lower rail between the lower rail and the floor, passes along the side of the lower rail, and extends upward. At a normal time, the upper-side hook and the lower-side hook are spaced apart from each other in the height direction so as to allow the upper rail to slide. However, in the event of a collision, the upper-side hook and the lower-side hook are hooked to each other due to an input of a large load in a detaching direction from the anchor bracket supporting the seat belt anchor so as to prevent detaching of the upper rail from the lower rail.

SUMMARY

In JP 4-57435 U, in order to widely cover the slide range of the upper rail, the lower-side hook is formed into a shape that is elongated in a sliding direction. Therefore, if a large load in the detaching direction is applied to the lower-side hook from the upper-side hook in emergency such as in the event of a collision of the vehicle, there is a possibility that only a portion, subjected to the load, of the lower-side hook is deformed to a shape that is largely raised locally compared to the other portion. There is a possibility that, due to this deformation, the upper-side hook that is located at a position of this deformation cannot be moved in the sliding direction with respect to the lower-side hook, so that it is not possible to slide the upper-side hook forward so as to enlarge an entrance/exit opening for a rear seat. The disclosure provides a slide rail that, even if a fixed-side engaging portion (lower-side hook) constituting a reinforcing structure for reinforcing the slide rail at the time of an input of a large load is deformed due to an input of a force in a detaching direction by a movable-side engaging portion (upper-side hook), allows the movable-side engaging portion to slide.

A slide rail of the invention has the following configurations.

One aspect of the disclosure is a slide rail including a fixed-side rail that is attached to a vehicle body; a movable-side rail that is slidably attached to the fixed-side rail; and a reinforcing structure that is configured to prevent detachment of the movable-side rail from the fixed-side rail. The reinforcing structure includes a fixed-side engaging portion that is attached to the fixed-side rail, and a movable-side engaging portion that is attached to the movable-side rail, and both engaging portions are configured, while allowing sliding of the movable-side rail, to come in contact with each other due to an action by a large load in a detaching direction that is input between both rails, and to be engaged with each other to restrict movement of the movable-side rail in the detaching direction. A contact surface, that comes in contact with the movable-side engaging portion, of the fixed-side engaging portion includes surface regions. The surface regions having mutually different height positions in the detaching direction are provided side by side in a sliding direction.

According to this aspect, even if the lower-side surface region of the contact surface of the fixed-side engaging portion is deformed so as to be raised to a high position by the movable-side engaging portion due to the input of the large load in the state where the movable-side engaging portion is located at the lower-side surface region of the contact surface, since the other surface region of the contact surface is located at a high position, the movement of the movable-side engaging portion in the sliding direction is hardly impeded. Therefore, even after the deformation, it is possible to allow the sliding of the movable-side engaging portion.

In the above-described aspect, the contact surface may be configured such that the surface regions having the mutually different height positions in the detaching direction are continuously connected to each other via an inclined surface.

With this configuration, since the surface regions, having the mutually different height positions in the detaching direction, of the contact surface are connected to each other without a step, the sliding of the movable-side engaging portion after the deformation is more hardly impeded. Further, since the cross-sectional shape of the fixed-side engaging portion does not change sharply, the fixed-side engaging portion can be configured to have a high structural strength.

In the above-described aspect, the surface regions, having mutually different height positions in the detaching direction, of the contact surface may respectively be surfaces each being perpendicular to the detaching direction.

With this configuration, the large load in the detaching direction that is input to the fixed-side engaging portion from the movable-side engaging portion can be transmitted straightforwardly to the fixed-side engaging portion, so that the fixed-side engaging portion can firmly support the large load.

In the above-described aspect, the fixed-side engaging portion and the movable-side engaging portion may be configured such that hook portions respectively formed at distal end portions of the fixed-side engaging portion and the movable-side engaging portion are hookingly engaged with each other by the input action of the large load in the detaching direction.

With this configuration, the large load in the detaching direction that is input to the fixed-side engaging portion from the movable-side engaging portion can be reliably received without loss by a hooking structure between the hook portions of both engaging portions.

In the above-described aspect, the movable-side engaging portion may be attached to a bracket that is attached to the movable-side rail and that is configured to be attached with a seat belt anchor.

With this configuration, the movable-side engaging portion can be attached to the bracket attached to the movable-side rail after loosely hooking the movable-side engaging portion to the fixed-side engaging portion, so that it is possible to improve the ease of assembly. Further, it is possible to provide a high-versatility configuration such that the movable-side engaging portion and the bracket are individually replaceable.

In the above-described aspect, the slide rail may be configured to couple a vehicle seat so as to be slidable in a vehicle longitudinal direction with respect to a vehicle floor as the vehicle body. The fixed-side engaging portion may be attached to a rear end portion of the fixed-side rail. The contact surface may be configured such that a rear-side surface region is formed at a position lower than a front-side surface region. The movable-side engaging portion may be configured to receive the input of the large load in the detaching direction from a seat belt anchor.

With this configuration, since the fixed-side engaging portion is attached to the rear end portion of the fixed-side rail, when a front collision of the vehicle occurs in the state where the movable-side rail is located near a rearmost position, the large load in the detaching direction is input to the fixed-side engaging portion from the seat belt anchor via the movable-side engaging portion. In this event, since the contact surface of the fixed-side engaging portion has the shape such that the rear-side surface region is lower than the front-side surface region, even if either of the surface regions is deformed to a raised shape depending on a slide position of the movable-side rail, the movable-side engaging portion tends to be held in a state in which the movable-side engaging portion can slide forward. Therefore, it is possible to slide the movable-side rail forward after the occurrence of the collision so as to properly enlarge an entrance/exit opening for a rear seat.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinbelow, a mode for carrying out the disclosure will be described with reference to the drawings.

Figure 1:
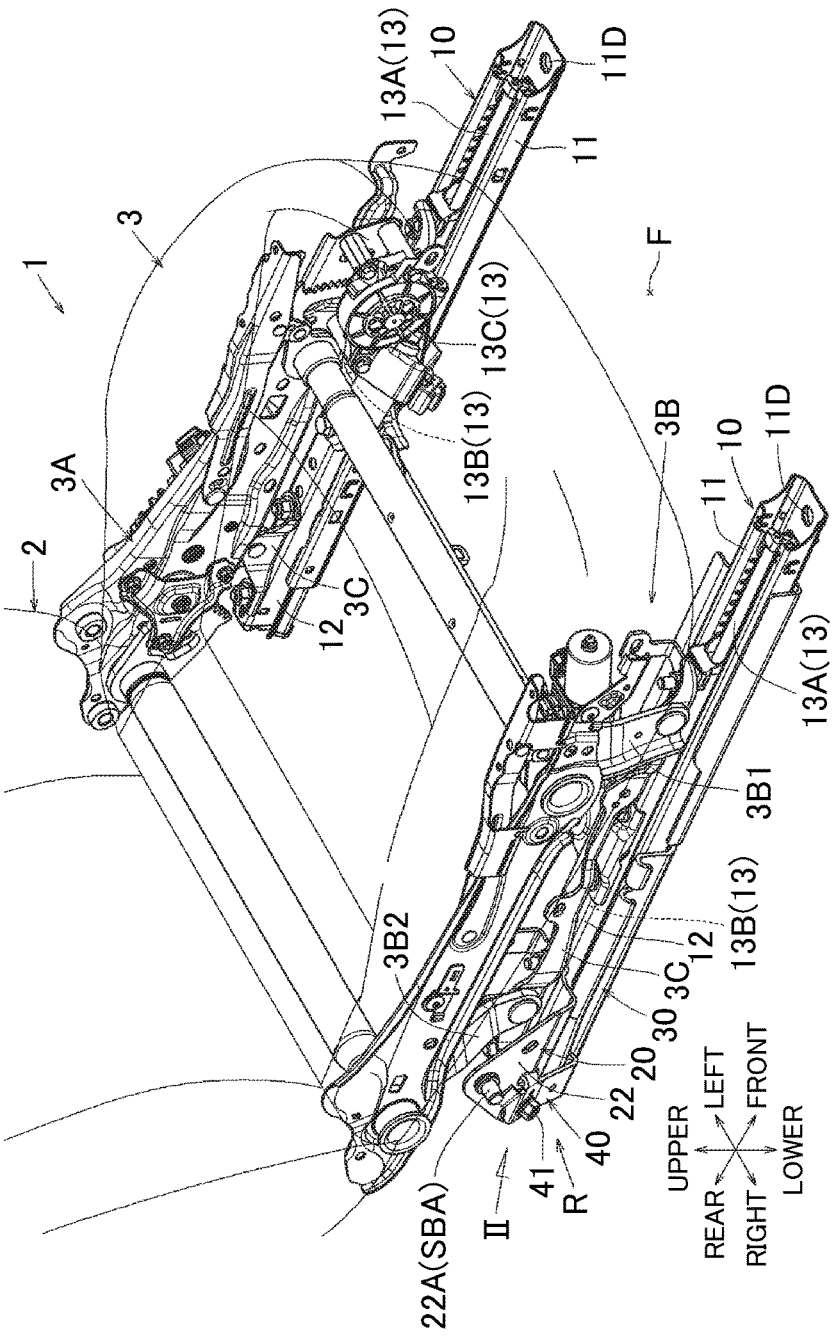
FIG. 1 is a perspective view showing a schematic configuration of a seat to which slide rails of a first embodiment are applied.

First, the configurations of slide rails 10 of a first embodiment will be described with reference to FIGS. 1 to 8. In this embodiment, as shown in FIG. 1, the slide rails 10 are provided in left and right pair between a seat 1 (vehicle seat) and a floor F (vehicle body) of an automobile. The slide rails 10 are configured as a seat adjuster that couples the seat 1 to the floor F so as to be adjustable in position in a vehicle longitudinal direction with respect to the floor F.

Specifically, it is configured that, by driving and stopping electric drive units 13 that are respectively incorporated in the slide rails 10, the slide rails 10 slide the seat 1 in the vehicle longitudinal direction with respect to the floor F and retain the seat 1 at positions to which the seat 1 is slid. The drive units 13 can be driven by operating a switch (not shown) provided at an outer side portion of a seat cushion 3.

The seat 1 is configured as a left seat of the automobile and includes a seat back 2 serving as a backrest for a seated occupant, and the seat cushion 3 serving as a seating portion. Lower end portions on both left and right sides of the seat back 2 are respectively coupled to rear end portions on both left and right sides of the seat cushion 3. A bottom surface portion of the seat cushion 3 is coupled to the floor F via the pair of left and right slide rails 10 interposed therebetween so as to be slidable in the vehicle longitudinal direction.

Each slide rail 10 includes a lower rail 11 that is attached to the floor F, an upper rail 12 that is attached to a lower portion of the seat cushion 3 and is attached to the lower rail 11 so as to be slidable in the vehicle longitudinal direction, and the drive unit 13 that is attached between the upper rail 12 and the lower rail 11 in a power transmittable manner. Herein, the lower rail 11 functions as a "fixed-side rail" of the disclosure, while the upper rail 12 functions as a "movable-side rail" of the disclosure.

Each slide rail 10 is normally held in a state in which the upper rail 12 is prevented from sliding relative to the lower rail 11 by the application of a braking force that is caused by the drive unit 13 being stopped. Then, when the drive units 13 are driven in a forward or reverse direction by operating the switch (not shown), the upper rails 12 are moved to slide in the vehicle longitudinal direction with respect to the lower rails 11, so that the slide rails 10 adjust the position of the seat 1 in the vehicle longitudinal direction with respect to the floor F.

Specifically, the seat cushion 3 is coupled to the pair of left and right slide rails 10 via an electric seat lifter 3B that includes a pair of left and right front links 3B1 and a pair of left and right rear links 3B2. The pair of left and right front links 3B1 and the pair of left and right rear links 3B2 respectively have upper end portions that are rotatably pin-coupled to side frames on the respective sides of a cushion frame 3A forming a skeleton of the seat cushion 3. The front links 3B1 and the rear links 3B2 respectively have lower end portions that are rotatably pin-coupled to support brackets 3C fixed to the upper rails 12 of the slide rails 10 on the respective sides.

By the coupling described above, the seat lifter 3B adjusts the height position of the seat 1 relative to the floor F by a link motion of single degree of freedom in which the pair of left and right front links 3B1 and the pair of left and right rear links 3B2 are cooperatively moved. The seat lifter 3B further includes a drive unit (not shown) that is coupled to the rear link 3B2 on the left side, i.e. on the outer side in a vehicle width direction. The drive unit (not shown) is configured to transmit a rotational driving force or a braking force to the rear link 3B2 on the left side.

With this configuration, the seat lifter 3B is normally held in a state in which the up-down rotation of the links 3B1 and 3B2 is stopped by the application of a braking force that is caused by the drive unit (not shown) being stopped. Then, when the drive unit (not shown) is driven in a forward or reverse direction by operating a switch, the links 3B1 and 3B2 are moved to up-down rotate all at once, so that the seat lifter 3B adjusts the height position of the seat 1 relative to the floor F.

Figure 2:
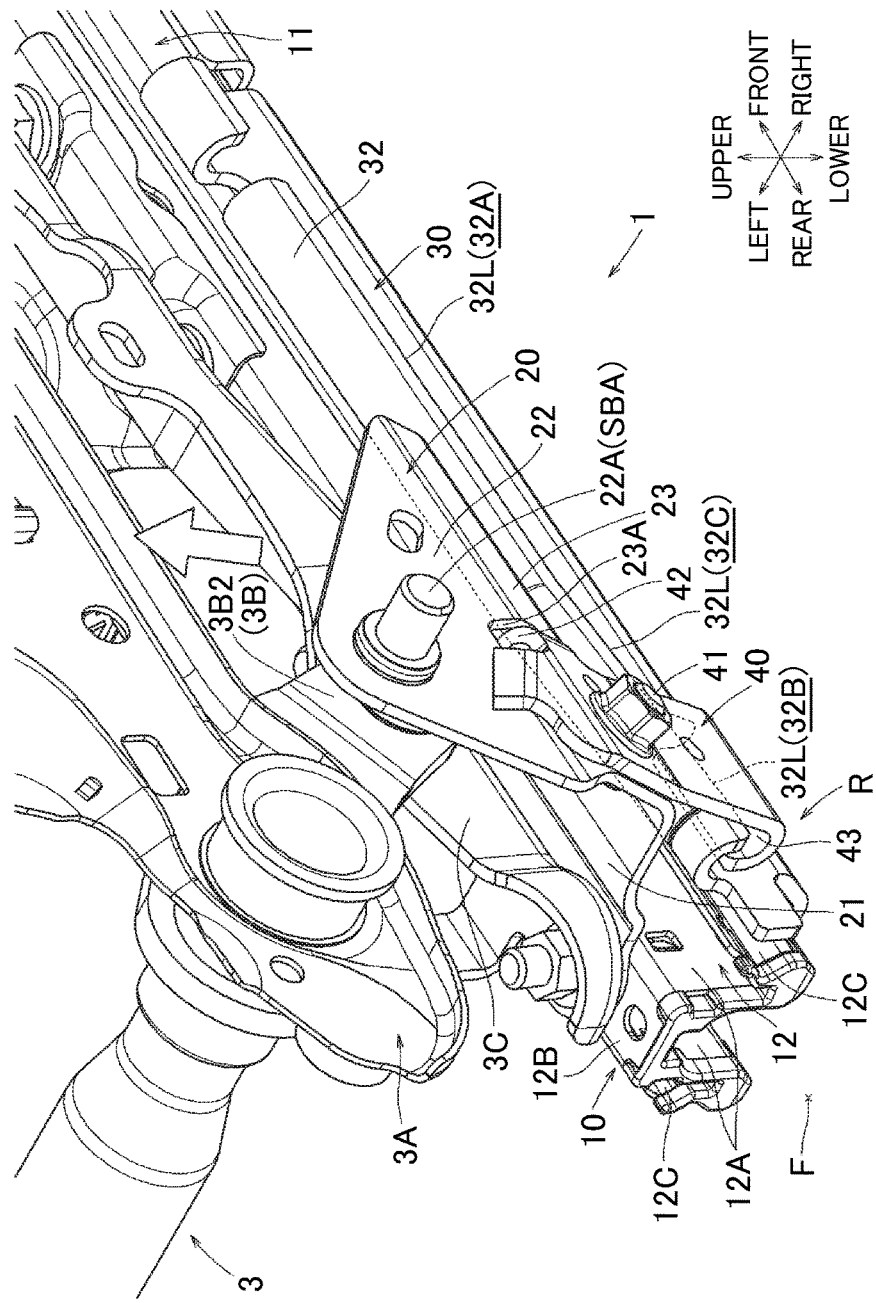
FIG. 2 is an enlarged view taken in the direction of arrow II of FIG. 1.
Figure 3:
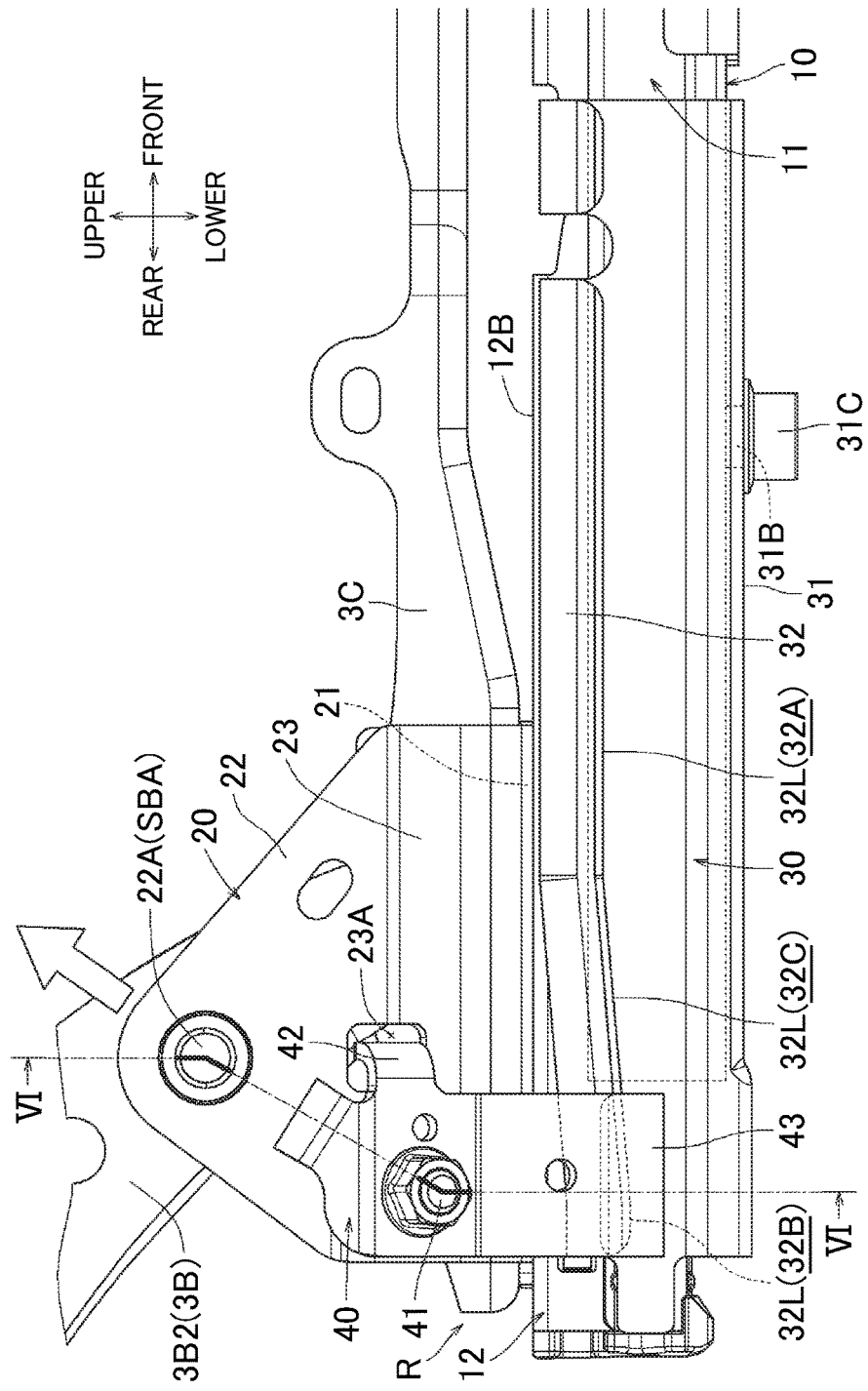
FIG. 3 is a side view of FIG. 2.

An anchor bracket 20 attached with a seat belt anchor SBA (buckle) (not shown) is joined to the slide rail 10 on the right side, i.e. on the inner side in the vehicle width direction of the seat cushion 3, at a position on a rear end portion of the upper rail 12. Accordingly, in the event of a front collision of the vehicle, the right slide rail 10 is configured to receive an input of a large load in a detaching direction due to support of the body of the seated occupant by a seat belt device via the seat belt anchor SBA (not shown). When the upper rail 12 is in a state in which the upper rail 12 slides to a maximum rearward slide position (rearmost position) with respect to the lower rail 11 and protrudes rearward from the lower rail 11 as shown in FIGS. 2 and 3, the large load acts particularly strong as a load that deforms the upper rail 12 in a direction of detaching the upper rail 12 from the lower rail 11.

Therefore, a reinforcing structure R for preventing the above-described deformation in the detaching direction is provided at a portion, to which the load in the detaching direction is applied strongly, between the upper rail 12 and the lower rail 11. Specifically, the reinforcing structure R includes a lower-side J hook 30 that is attached to a rear end region of the lower rail 11, and an upper-side J hook 40 that is attached to a rear end region of the upper rail 12. Herein, the lower-side J hook 30 functions as a "fixed-side engaging portion" of the disclosure, while the upper-side J hook 40 functions as a "movable-side engaging portion" of the disclosure.

Figure 6:
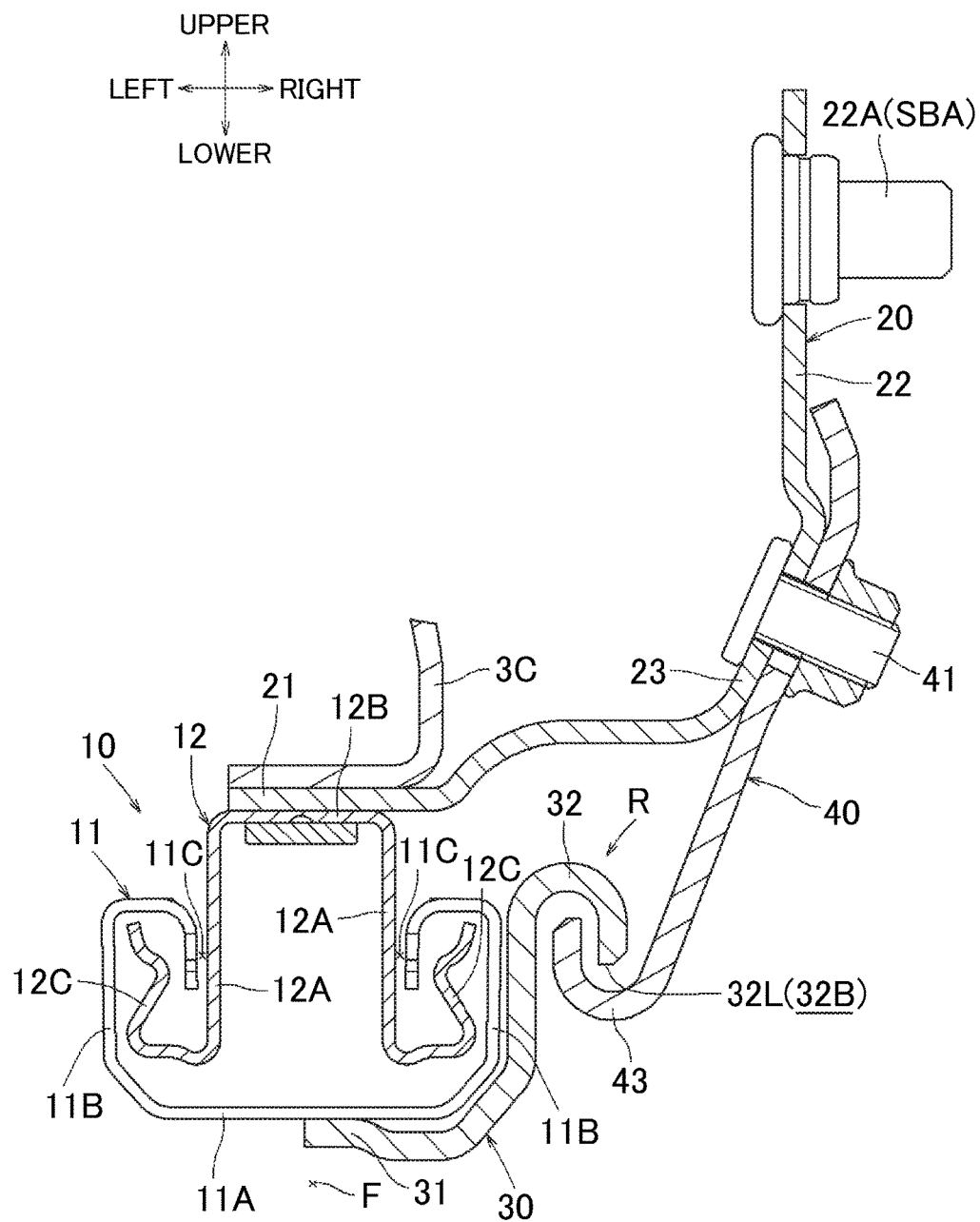
FIG. 6 is a sectional view taken along line VI-VI of FIG. 3.

As shown in FIG. 6, the lower-side J hook 30 and the upper-side J hook 40 have shapes that are bent back to allow the lower-side J hook 30 and the upper-side J hook 40 to be hooked to each other in the height direction. Specifically, the lower-side J hook 30 and the upper-side J hook 40 are configured to be loosely hooked to each other so as not to impede the sliding movement of the upper rail 12 in the vehicle longitudinal direction with respect to the lower rail 11.

The reinforcing structure R is normally configured such that the upper-side J hook 40 is slightly spaced apart from the lower-side J hook 30 in the height direction and in the vehicle width direction so as not to impede the sliding movement of the upper rail 12 in the vehicle longitudinal direction with respect to the lower rail 11. However, when the large load in the detaching direction is input to the seat belt anchor SBA due to the occurrence of a front collision of the vehicle in the state where the upper rail 12 slides to the maximum rearward slide position (rearmost position) as described above with reference to FIGS. 2 and 3, the reinforcing structure R is configured such that the upper-side J hook 40 is hooked to the lower-side J hook 30 in a state of abutting against the lower-side J hook 30 from the lower side as shown in FIG. 7 so as to firmly receive the load therebetween.

By the reception of the load by the reinforcing structure R, plastic deformation of the upper rail 12 in the detaching direction with respect to the lower rail 11 is suppressed. As a result, even after the occurrence of the front collision of the vehicle, the upper rail 12 is maintained in a state in which the upper rail 12 can slide in the vehicle longitudinal direction with respect to the lower rail 11. Therefore, even after the collision, it may be possible, for example, to slide the seat 1 forward so as to enlarge an entrance/exit opening for a rear seat.

Figure 7:
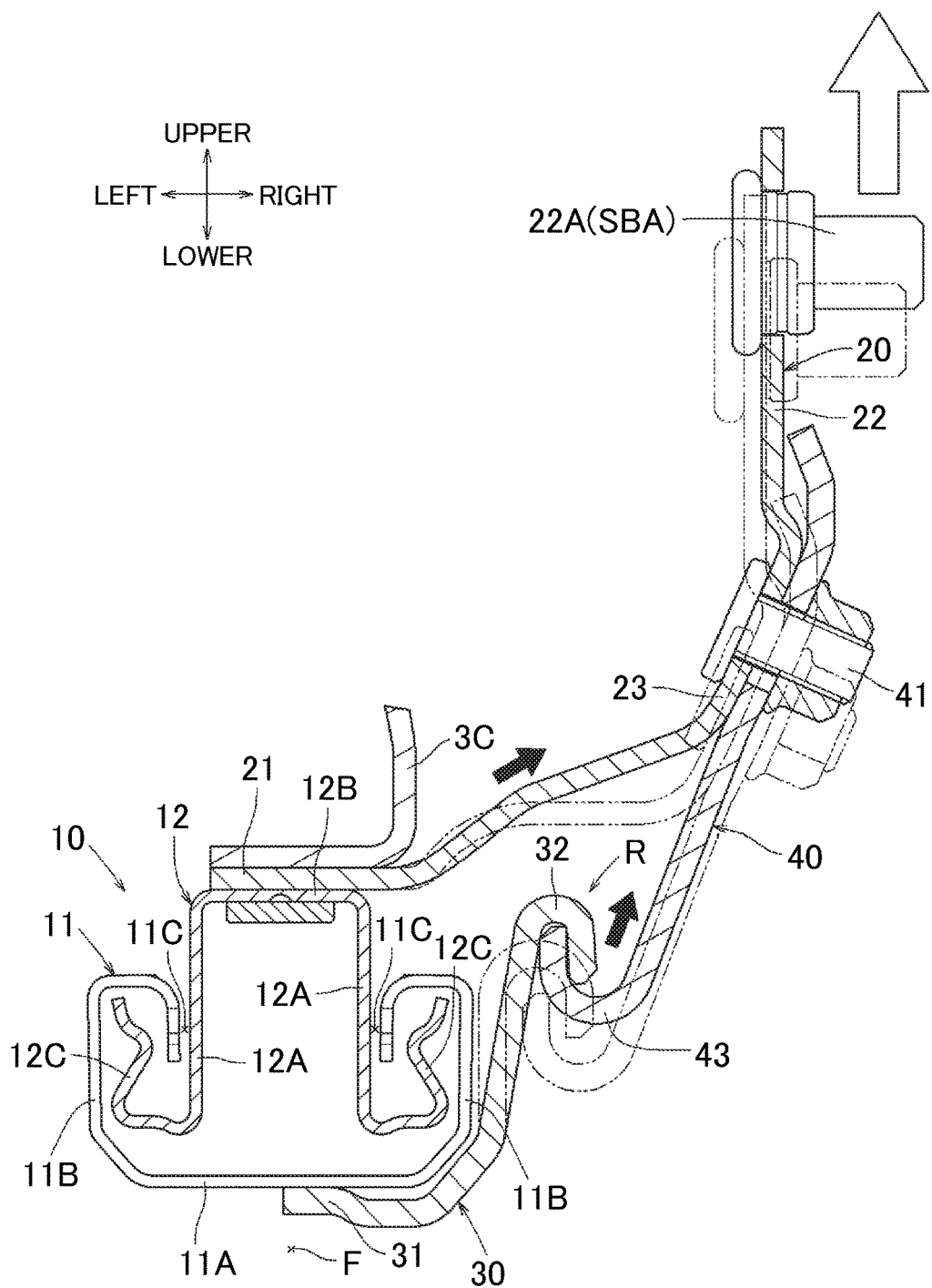
FIG. 7 is a sectional view showing a state in which the reinforcing structure is deformed from FIG. 6 due to an input of a detaching load.

However, in the reinforcing structure R, as shown in FIG. 7, when the large load that is input between the upper-side J hook 40 and the lower-side J hook 30 is of a degree that cannot be received without plastic deformation of these hooks, a portion, hooked to the upper-side J hook 40, of the lower-side J hook 30 may be deformed to a locally raised shape. Then, after the deformation, if the upper-side J hook 40 is held at the raised position due to deformation of other members such as the anchor bracket 20, the upper-side J hook 40 is in a state in which the upper-side J hook 40 cannot slide forward from that position. The reason for this is that a front-side portion, that is not deformed, of the lower-side J hook 30 stands blocking in front of the upper-side J hook 40 so as to impede sliding of the upper-side J hook 40.

Figure 8:
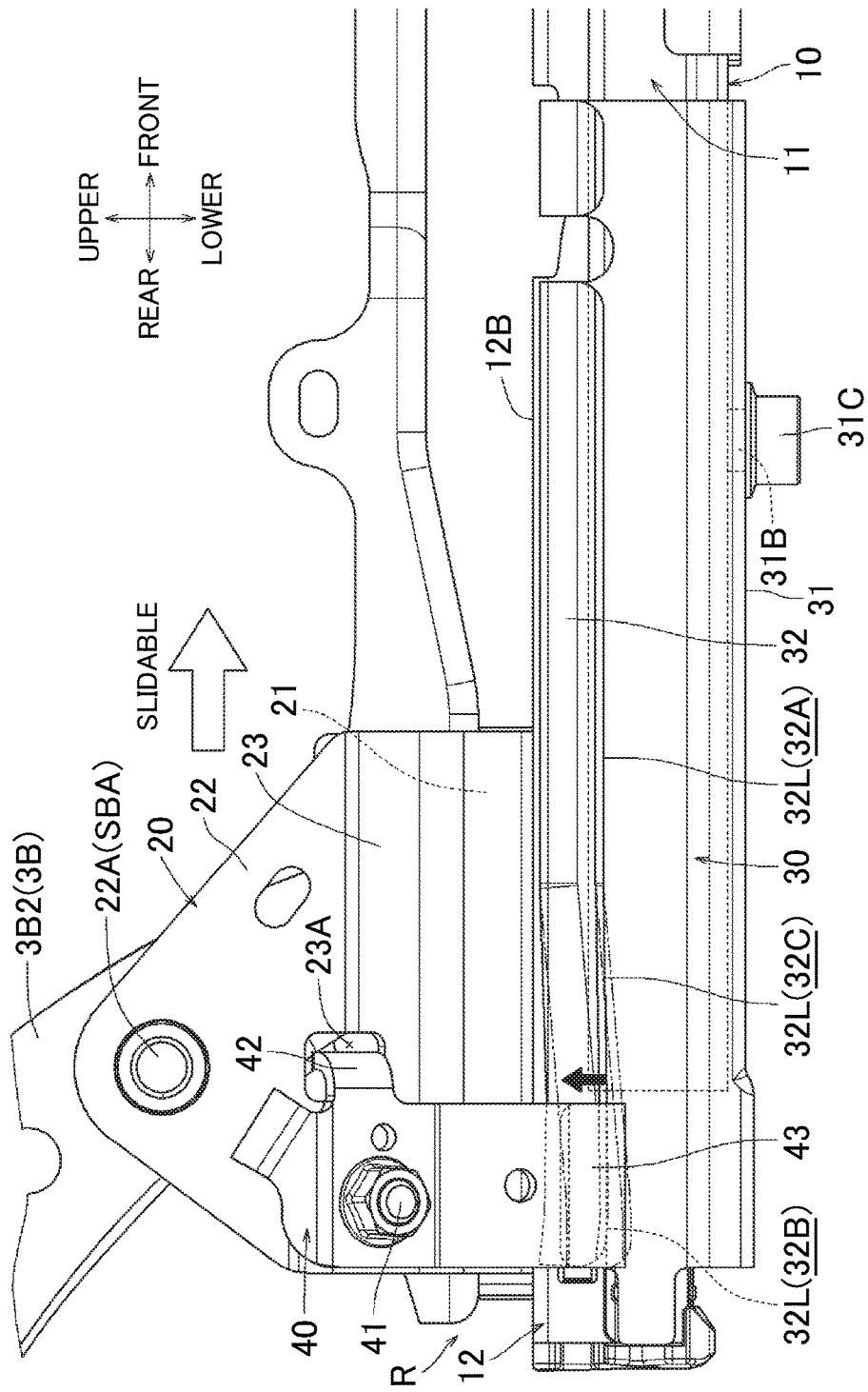
FIG. 8 is a side view showing, corresponding to FIG. 3, a state in which a movable-side engaging portion is allowed to slide after the deformation of FIG. 7.

Therefore, the reinforcing structure R employs a structure that, even in the case where the large load that causes the plastic deformation as described above is input, deforms the lower-side J hook 30 so as to allow the upper-side J hook 40 to slide forward after the deformation. Specifically, as shown in FIG. 3, a lower surface 32L on a distal end side of a hook portion 32, that comes in contact with the upper-side J hook 40, of the lower-side J hook 30 is configured such that a rear-side surface region 32B is formed at a position lower than a front-side surface region 32A. With this configuration, as shown in FIG. 8, even if the rear-side surface region 32B of the lower-side J hook 30 is deformed to a raised shape by the upper-side J hook 40, since the front-side surface region 32A is located at a position higher than the rear-side surface region 32B after the deformation, the shape of the lower-side J hook 30 does not stand blocking in front of the upper-side J hook 40 and allows the upper-side J hook 40 to slide forward. Herein, the lower surface 32L on the distal end side of the hook portion 32 of the lower-side J hook 30 functions as a "contact surface" of the disclosure. Hereinbelow, a specific configuration of the reinforcing structure R will be described in detail along with its peripheral structure.

First, the configuration of the slide rail 10 will be described with reference to FIGS. 1, 4, and 6. That is, as described above, the slide rail 10 includes the lower rail 11, the upper rail 12, and the drive unit 13.

The lower rail 11 is formed by bending a single steel plate, elongated in the vehicle longitudinal direction, into a cross-sectional shape of a generally U-shape in a transverse direction. Specifically, as shown in FIGS. 4 and 6, the lower rail 11 is formed into a cross-sectional shape having a bottom surface portion 11A that is provided on the floor F with its surface facing upward, and a pair of left and right lower-side fin portions 11B that rise upward from edge portions on both left and right sides of the bottom surface portion 11A and extend so as to be bent inward toward each other to have inverted U-shapes. The lower rail 11 has a cross-sectional shape that is generally uniform in the vehicle longitudinal direction, and front and rear two portions of the bottom surface portion 11A are integrally joined to the floor F by bolt fastening.

The upper rail 12 is formed by bending a single steel plate, elongated in the vehicle longitudinal direction, into a cross-sectional shape of a generally hat shape in a transverse direction. Specifically, as shown in FIGS. 4 and 6, the upper rail 12 is formed into a cross-sectional shape having a pair of left and right vertical surface portions 12A that extend so as to rise in the height direction, a top plate surface portion 12B that extends in the vehicle width direction so as to connect between upper edge portions of the vertical surface portions 12A, and a pair of left and right upper-side fin portions 12C that are bent back from lower edge portions of the vertical surface portions 12A so as to warp up in a U-shape toward the outer sides that are opposite to each other. The upper rail 12 has a cross-sectional shape that is generally uniform in the vehicle longitudinal direction.

The upper rail 12 is attached to the lower rail 11 such that the upper rail 12 is inserted into the lower rail 11 from its end portion on one side in its longitudinal direction, i.e. in the vehicle longitudinal direction. Specifically, the upper rail 12 is attached to the lower rail 11 such that the left and right upper-side fin portions 12C each bent back into the U-shape are inserted into the lower rail 11 from an end portion on one side in the vehicle longitudinal direction so as to be loosely fitted into the left and right lower-side fin portions 11B, each bent back into the inverted U-shape, of the lower rail 11. With this configuration, the upper rail 12 is attached to the lower rail 11 such that the upper rail 12 and the lower rail 11 are prevented from being separated from each other in the up-down and left-right directions in the state where the left and right upper-side fin portions 12C are loosely fitted to the left and right lower-side fin portions 11B.

Between the upper rail 12 and the lower rail 11, resin shoes (not shown) are provided for gap filling therebetween in the height direction and in the vehicle width direction. These resin shoes are provided at four corners between the upper rail 12 and the lower rail 11 and are configured to perform gap filling between the upper rail 12 and the lower rail 11 in the height direction and in the vehicle width direction without impeding the sliding of the upper rail 12 relative to the lower rail 11 by their excellent sliding properties.

In the assembled state of the upper rail 12 and the lower rail 11, the top plate surface portion 12B of the upper rail 12 is provided to protrude upward through a gap 11C between the left and right lower-side fin portions 11B of the lower rail 11. The support bracket 3C for coupling the lower end portions of the front link 3B1 and the rear link 3B2 of the seat lifter 3B described above with reference to FIG. 1 is integrally joined to the protruding top plate surface portion 12B of the upper rail 12 by bolt fastening.

Further, as shown in FIG. 2, the anchor bracket 20 which is bent into a generally L-plate shape and to which the seat belt anchor SBA (buckle) is attached is integrally joined to a rear end portion of the top plate surface portion 12B of the upper rail 12 by bolt fastening. As shown in FIGS. 2, 4, and 6, the anchor bracket 20 is formed by bending a single steel plate into a cross-sectional shape of a generally L-plate shape. The anchor bracket 20 is bent into a generally L-plate shape having a bottom plate portion 21 that is provided on the top plate surface portion 12B of the upper rail 12 with its surface facing upward, an inclined plate portion 23 that extends so as to rise obliquely upward from an edge portion on the right side, i.e. on the outer side in the vehicle width direction, of the bottom plate portion 21, and an upright plate portion 22 that extends so as to rise upright from an upper edge portion of the inclined plate portion 23.

The anchor bracket 20 is disposed in a state in which the bottom plate portion 21 is sandwiched in the height direction between the top plate surface portion 12B of the upper rail 12 and the support bracket 3C. The bottom plate portion 21 of the anchor bracket 20 is integrally fastened to the top plate surface portion 12B of the upper rail 12 and the support bracket 3C by bolt fastening that is carried out at front and rear two portions in the height direction therethrough.

As shown in FIG. 6, the anchor bracket 20 has a shape such that the bottom plate portion 21 extends to a position that protrudes to the right side, i.e. to the outer side in the vehicle width direction, from the top plate surface portion 12B of the upper rail 12. A portion, extending to the outer side in the vehicle width direction from the top plate surface portion 12B of the upper rail 12, of the bottom plate portion 21 is bent so as to be raised stepwise for preventing the interference with the lower-side J hook 30. Then, the anchor bracket 20 has a shape such that the inclined plate portion 23 rises obliquely upward from a position to which the bottom plate portion 21 extends toward the outer side in the vehicle width direction beyond the top plate surface portion 12B of the upper rail 12 and the lower-side J hook 30. The upper-side J hook 40 is applied to the inclined plate portion 23 from the outer side in the vehicle width direction, and a bolt 41 is inserted therethrough such that the upper-side J hook 40 and the inclined plate portion 23 are integrally fastened to each other.

Figure 4:
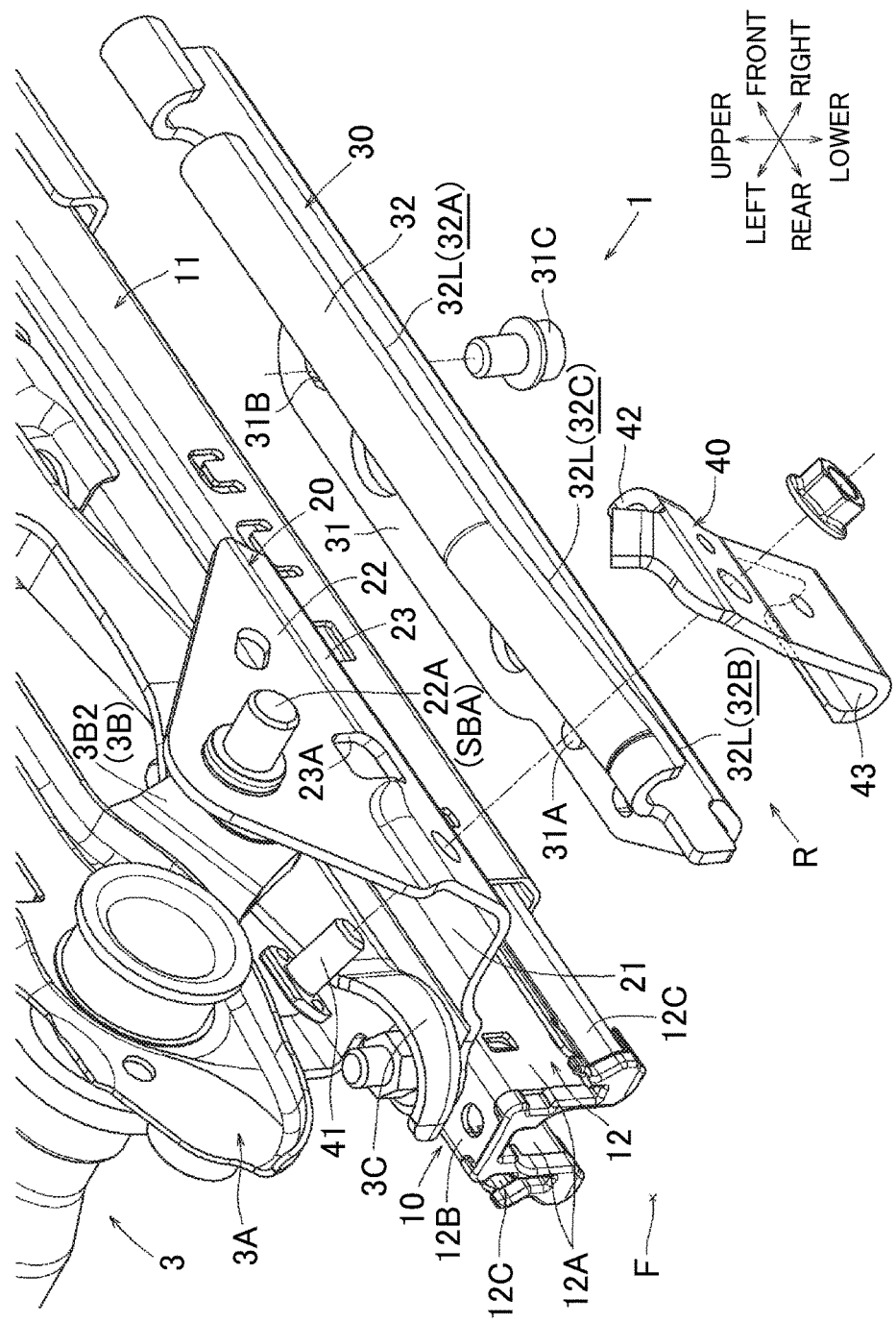
FIG. 4 is an exploded perspective view of a reinforcing structure.

As shown in FIGS. 2, 4, and 6, an anchor bolt 22A for attaching the seat belt anchor SBA (buckle) is inserted through the upright plate portion 22 rising from the upper edge portion of the inclined plate portion 23 of the anchor bracket 20 so as to protrude from the inner side to the outer side in the vehicle width direction such that the anchor bolt 22A is integrally joined to the upright plate portion 22. As shown in FIGS. 2 to 4, the inclined plate portion 23 is formed with a rectangular insertion hole 23A to which a hook lug 42 provided to the upper-side J hook 40 is attached in a state of being inserted from the outer side in the vehicle width direction. The insertion hole 23A is formed at a position approximately just below an attaching portion of the anchor bolt 22A.

As shown in FIG. 1, the drive unit 13 includes a feed screw shaft 13A that is attached in a state in which front and rear end portions thereof are fixed to the bottom surface portion 11A of the lower rail 11, a nut body 13B that is threaded on the feed screw shaft 13A and attached to the top plate surface portion 12B of the upper rail 12, and a drive motor 13C that transmits a rotational driving force to the nut body 13B. The drive unit 13 is configured such that when a rotational driving force in a forward or reverse direction or a braking force output from the drive motor 13C is transmitted to the nut body 13B, the nut body 13B is moved in an axial direction or stopped relative to the feed screw shaft 13A so as to move the upper rail 12 in a sliding direction or stop the upper rail 12 relative to the lower rail 11.

Next, the configuration of the reinforcing structure R provided between the lower rail 11 and the upper rail 12 will be described. That is, as shown in FIGS. 2 to 4, the reinforcing structure R includes the lower-side J hook 30 that is attached to the rear end region of the lower rail 11, and the upper-side J hook 40 that is attached to the rear end region of the upper rail 12. The lower-side J hook 30 is formed by bending a single steel plate into a cross-sectional shape of a generally L-shape.

As shown in FIG. 6, the lower-side J hook 30 has a shape having a bottom plate portion 31 that is provided so as to be sandwiched between the bottom surface portion 11A of the lower rail 11 and the floor F with its surface facing upward, and the hook portion 32 that rises along the shape of an outer peripheral surface of the lower rail 11 from an edge portion on the outer side in the vehicle width direction of the bottom plate portion 31 and is bent at a rising end into an inverted U-shape toward the outer side in the vehicle width direction. As shown in FIG. 3, the lower-side J hook 30 is formed into an elongated shape having a length in the vehicle longitudinal direction that is slightly shorter than a half of the length in the vehicle longitudinal direction of the lower rail 11.

Since the lower-side J hook 30 is elongated in the vehicle longitudinal direction as described above, the lower-side J hook 30 is configured such that the upper-side J hook 40 can be hooked to the rear-side surface region 32B of the hook portion 32 in the state where the upper rail 12 is retreated to the maximum rearward slide position. Even in the state where the upper rail 12 is advanced from the maximum rearward slide position to a slide position in which the upper rail 12 is completely received in the lower rail 11, the lower-side J hook 30 is configured such that the upper-side J hook 40 can be hooked to the hook portion 32.

As shown in FIG. 6, the lower-side J hook 30 is in a state where the bottom plate portion 31 is disposed so as to be sandwiched between the bottom surface portion 11A of the lower rail 11 and the floor F, and where a plurality of portions in the vehicle longitudinal direction of the bottom plate portion 31 are integrally fastened to the lower rail 11. Specifically, as shown in FIG. 4, the bottom plate portion 31 of the lower-side J hook 30 is formed, at its portion rearward of the middle in the vehicle longitudinal direction, with a dowel 31A that is half-blanked to protrude upward in a cylindrical shape. Further, the bottom plate portion 31 of the lower-side J hook 30 is formed, at its portion near its front end portion, with a fastening hole 31B in the form of a round hole passing therethrough in the height direction.

The lower-side J hook 30 is in a state in which the bottom plate portion 31 is integrally joined to the bottom surface portion 11A of the lower rail 11 by fitting from the lower side the dowel 31A, formed in the bottom plate portion 31, into a dowel hole (not shown) formed in the bottom surface portion 11A of the lower rail 11, and by aligning the fastening hole 31B with a fastening hole (not shown) formed in the bottom surface portion 11A of the lower rail 11 and then inserting a bolt 31C through these holes from the lower side to integrally fasten them. Further, after the bottom plate portion 31 is joined to the bottom surface portion 11A of the lower rail 11 as described above, bolts (not shown) for fixing the bottom surface portion 11A of the lower rail 11 to the floor F are inserted from the upper side through an approximately middle region in the vehicle longitudinal direction of the bottom plate portion 31 to integrally fasten them, so that the lower-side J hook 30 is integrally joined to the floor F along with the bottom surface portion 11A of the lower rail 11.

Figure 5:
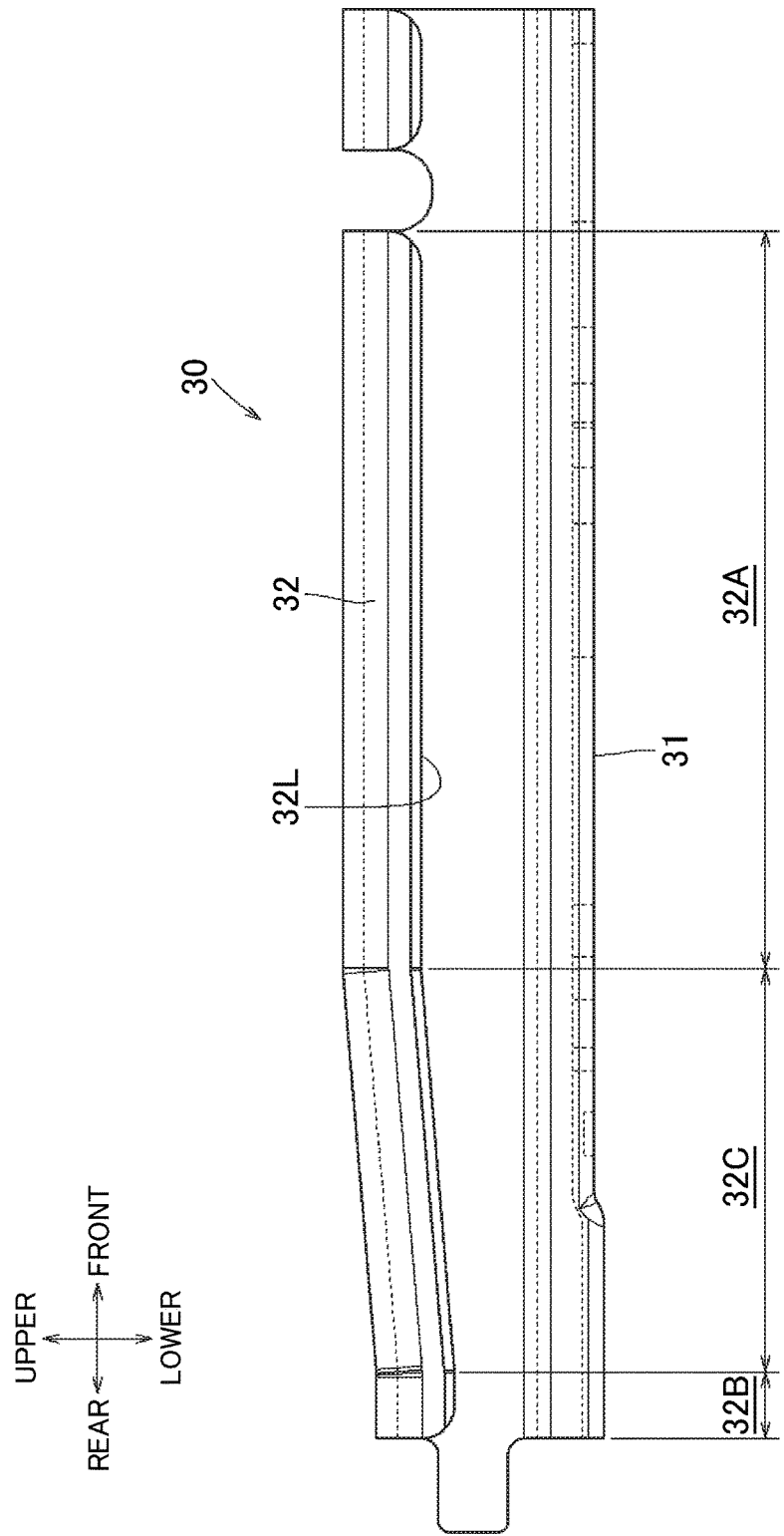
FIG. 5 is a side view of a fixed-side engaging portion alone.

As shown in FIG. 6, the hook portion 32 rises along the shape of the outer peripheral surface of the lower rail 11 from the edge portion on the outer side in the vehicle width direction of the bottom plate portion 31 and is bent into the inverted U-shape toward the outer side in the vehicle width direction at a position to which the hook portion 32 extends and which is higher than a top plate surface of the lower-side fin portion 11B of the lower rail 11. Specifically, as shown in FIG. 5, the hook portion 32 has a shape such that the height position in which the hook portion 32 is bent into the inverted U-shape, more specifically, the height position of the lower surface 32L on the distal end side that comes in contact with the upper-side J hook 40 when hooking to the upper-side J hook 40, differs depending on a region in the vehicle longitudinal direction.

More specifically, as shown in FIG. 3, the hook portion 32 has a shape such that the rear-side surface region 32B of the lower surface 32L on the distal end side, i.e. a surface region in which the upper-side J hook 40 is located when the upper rail 12 is retreated to the maximum rearward slide position, is formed at a position lower than the front-side surface region 32A, i.e. a surface region in which the upper-side J hook 40 is located when the upper rail 12 slides to the position in which the upper rail 12 is completely received in the lower rail 11. The rear-side surface region 32B and the front-side surface region 32A of the lower surface 32L on the distal end side of the hook portion 32 are connected to each other via an inclined surface 32C configured to connect therebetween by a continuous smooth flat surface.

As shown in FIGS. 2 to 4, the upper-side J hook 40 is formed by bending a single steel plate into a cross-sectional shape of a generally J-shape. The upper-side J hook 40 is formed into a plate shape that is narrower in width in the vehicle longitudinal direction than the lower-side J hook 30 and is elongated in the height direction. Specifically, as shown in FIGS. 4 and 6, a portion near an upper end portion of the upper-side J hook 40 is applied, in surface contact, to a portion near a rear end portion of the inclined plate portion 23 of the anchor bracket 20 from the outer side in the vehicle width direction, and the bolt 41 is inserted therethrough from the inner side (left side) in the vehicle width direction to integrally fasten them, so that the upper-side J hook 40 is integrally joined to the inclined plate portion 23 of the anchor bracket 20.

As shown in FIGS. 2 to 4, the upper-side J hook 40 is formed, at its front-side edge portion located side by side in the vehicle longitudinal direction with its portion that is fastened by the bolt 41, with the hook lug 42 that is bent at a right angle toward the inner side in the vehicle width direction. When the upper-side J hook 40 is attached, in surface contact, to the inclined plate portion 23 of the anchor bracket 20 from the outer side in the vehicle width direction, the hook lug 42 is inserted into the insertion hole 23A formed in the anchor bracket 20 such that a lower surface of the hook lug 42 is in abutment with a surface on the lower side of the insertion hole 23A.

With this configuration, as shown in FIG. 3, the upper-side J hook 40 can firmly receive, by a hooking force of the hook lug 42 inserted into the insertion hole 23A, a force that acts on the upper-side J hook 40 to pull it downward relative to the anchor bracket 20 due to hooking to the lower-side J hook 30 at the time of an input of a large load. Specifically, since the hook lug 42 is hooked at the position approximately just below the attaching portion of the anchor bolt 22A in the anchor bracket 20, the hook lug 42 is configured to firmly receive a large load in a detaching direction that is input from the anchor bolt 22A.

As shown in FIGS. 4 and 6, the upper-side J hook 40 has a shape such that an end portion, upward of the portion that is attached to the inclined plate portion 23 of the anchor bracket 20, of the upper-side J hook 40 is bent so as to approach the upright plate portion 22 of the anchor bracket 20. With this configuration, even when the upper-side J hook 40 is attached to the inclined plate portion 23 of the anchor bracket 20 and rises toward the outer side in the vehicle width direction, since its upper end portion is bent to the inner side in the vehicle width direction, the upper-side J hook 40 is attached in a state that does not make an edge to the outside.

The upper-side J hook 40 is formed at its lower end portion with a hook portion 43 that is bent back into a U-shape toward the inner side in the vehicle width direction. As shown in FIGS. 4 and 6, the hook portion 43 extends obliquely downward toward the inner side in the vehicle width direction along the inclination angle of the inclined plate portion 23 from the portion, attached to the inclined plate portion 23 of the anchor bracket 20, of the upper-side J hook 40 and is bent back into the U-shape toward the inner side in the vehicle width direction at a position lower than the top plate surface of the lower-side fin portion 11B of the lower rail 11. As shown in FIG. 3, the hook portion 43 is greater in width in the vehicle longitudinal direction than the rear-side surface region 32B of the lower surface 32L on the distal end side of the hook portion 32 of the lower-side J hook 30. When the upper rail 12 is retreated to the maximum rearward slide position, the hook portion 43 is located so as to be able to be hooked from the lower side to the rear-side surface region 32B of the lower surface 32L on the distal end side of the hook portion 32 of the lower-side J hook 30 over its entire region in the vehicle longitudinal direction.

In the state described above, as shown in FIG. 6, the hook portion 43 is loosely hooked to the hook portion 32 of the lower-side J hook 30 from the lower side such that the hook shapes of both portions moderately overlap each other to provide a slight gap therebetween in the height direction and in the vehicle width direction. Therefore, as shown in FIG. 3, since the upper-side J hook 40 is loosely hooked at the rear-side surface region 32B formed at the low position of the hook portion 32 of the lower-side J hook 30 as described above, even if the upper rail 12 is slid forward from that position, the shape of the lower-side J hook 30 does not stand blocking in front of the upper-side J hook 40. Therefore, the sliding movement of the upper rail 12 in the vehicle longitudinal direction with respect to the lower rail 11 is not impeded at the normal time.

The upper-side J hook 40 is attached to the anchor bracket 20 in the following manner. That is, in the state where the anchor bracket 20 is attached to the upper rail 12, where the lower-side J hook 30 is attached to the lower rail 11, and where the upper rail 12 is slidably attached to the lower rail 11, the hook portion 43 of the upper-side J hook 40 is loosely hooked to the hook portion 32 of the lower-side J hook 30 and is fastened to the anchor bracket 20 by the bolt 41. Since the upper-side J hook 40 is configured separately from the anchor bracket 20 as described above, even after the other peripheral components are attached as described above, it is possible to easily attach the upper-side J hook 40 to the lower-side J hook 30 in a loosely hooked state.

When the large load in the detaching direction is input to the seat belt anchor SBA due to the occurrence of a front collision of the vehicle in the state where the upper rail 12 is located at the maximum rearward slide position, the reinforcing structure R is configured such that, as shown in FIG. 7, the hook portion 43 of the upper-side J hook 40 is hooked to the hook portion 32 of the lower-side J hook 30 from the lower side so as to firmly receive the load therebetween. In this event, in the reinforcing structure R, when the large load that is input between the upper-side J hook 40 and the lower-side J hook 30 is of a degree that cannot be received without plastic deformation of these hooks, the rear-side surface region 32B of the lower surface 32L on the distal end side of the hook portion 32, hooked to the hook portion 43 of the upper-side J hook 40, of the lower-side J hook 30 may be deformed to a locally raised shape.

However, even if such deformation occurs, since the hook portion 32 of the lower-side J hook 30 is configured such that, as shown in FIG. 8, the front-side surface region 32A is formed at the position higher than the rear-side surface region 32B that is deformed in the raising direction, the front-side surface region 32A of the hook portion 32 of the lower-side J hook 30 does not stand blocking in front of the upper-side J hook 40 even after the deformation. Therefore, even if the upper-side J hook 40 is held at the raised position due to deformation of the other members such as the anchor bracket 20 after the deformation, it is possible to slide the upper-side J hook 40 forward from that position.

Specifically, since the surface region connecting between the rear-side surface region 32B, that is deformed in the raising direction, and the front-side surface region 32A of the hook portion 32 of the lower-side J hook 30 is formed by the inclined surface 32C configured to connect therebetween by the continuous smooth flat surface, even after the deformation, the rear-side surface region 32B and the front-side surface region 32A are held in a state of being connected to each other via a relatively continuous smooth flat surface by means of the inclined surface 32C. Therefore, the constituent surface of the lower-side J hook 30 hardly stands blocking in front of the upper-side J hook 40 even after the deformation, so that it is possible to slide the seat 1 forward after the collision so as to properly enlarge an entrance/exit opening for a rear seat.

The rear-side surface region 32B, that is deformed in the raising direction, of the hook portion 32 of the lower-side J hook 30 may be deformed to a position higher than the front-side surface region 32A. Even in that case, since the rear-side surface region 32B is formed at the position lower than the front-side surface region 32A in advance, the level difference in the height direction that is formed between the rear-side surface region 32B and the front-side surface region 32A can be made small after the deformation, and therefore, it is the same that the constituent surface of the lower-side J hook 30 hardly stands blocking in front of the upper-side J hook 40.

To summarize the above, the slide rail 10 of this embodiment is configured as follows. That is, a slide rail (slide rail 10) includes a fixed-side rail (lower rail 11) that is attached to a vehicle body (floor F); a movable-side rail (upper rail 12) that is slidably attached to the fixed-side rail (lower rail 11); and a reinforcing structure (reinforcing structure R) that is configured to prevent detachment of the movable-side rail (upper rail 12) from the fixed-side rail (lower rail 11). The reinforcing structure (reinforcing structure R) includes a fixed-side engaging portion (lower-side J hook 30) that is attached to the fixed-side rail (lower rail 11), and a movable-side engaging portion (upper-side J hook 40) that is attached to the movable-side rail (upper rail 12), and both engaging portions (both hooks 30, 40) are configured, while allowing sliding of the movable-side rail (upper rail 12), to come in contact with each other due to an action by a large load in a detaching direction that is input between both rails (both rails 11, 12), and to be engaged with each other to restrict movement of the movable-side rail (upper rail 12) in the detaching direction. A contact surface (lower surface 32L), that comes in contact with the movable-side engaging portion (upper-side J hook 40), of the fixed-side engaging portion (lower-side J hook 30) has a shape such that surface regions (front-side surface region 32A and rear-side surface region 32B) having mutually different height positions in the detaching direction are provided side by side in a sliding direction.

With this configuration, even if the lower-side surface region (rear-side surface region 32B) of the contact surface (lower surface 32L) of the fixed-side engaging portion (lower-side J hook 30) is deformed so as to be raised to a high position by the movable-side engaging portion (upper-side J hook 40) due to the input of the large load in the state where the movable-side engaging portion (upper-side J hook 40) is located at the lower-side surface region (rear-side surface region 32B) of the contact surface (lower surface 32L), since the other surface region (front-side surface region 32A) of the contact surface (lower surface 32L) is located at a high position, the movement of the movable-side engaging portion (upper-side J hook 40) in the sliding direction is hardly impeded. Therefore, even after the deformation, it is possible to allow the sliding of the movable-side engaging portion (upper-side J hook 40).

The contact surface (lower surface 32L) has a shape such that the surface regions (front-side surface region 32A and rear-side surface region 32B) having the mutually different height positions in the detaching direction are continuously connected to each other via an inclined surface (inclined surface 32C). With this configuration, since the surface regions (front-side surface region 32A and rear-side surface region 32B), having the mutually different height positions in the detaching direction, of the contact surface (lower surface 32L) are connected to each other without a step, the sliding of the movable-side engaging portion (upper-side J hook 40) after the deformation is more hardly impeded. Further, since the cross-sectional shape of the fixed-side engaging portion (lower-side J hook 30) does not change sharply, the fixed-side engaging portion (lower-side J hook 30) can be configured to have a high structural strength.

The surface regions (front-side surface region 32A and rear-side surface region 32B), having the mutually different height positions in the detaching direction, of the contact surface (lower surface 32L) respectively have surface shapes each being perpendicular to the detaching direction (height direction). With this configuration, the large load in the detaching direction that is input to the fixed-side engaging portion (lower-side J hook 30) from the movable-side engaging portion (upper-side J hook 40) can be transmitted straightforwardly to the fixed-side engaging portion (lower-side J hook 30), so that the fixed-side engaging portion (lower-side J hook 30) can firmly support the large load.

The fixed-side engaging portion (lower-side J hook 30) and the movable-side engaging portion (upper-side J hook 40) are configured such that hook portions (hook portions 32, 43) respectively formed at distal end portions of the fixed-side engaging portion (lower-side J hook 30) and the movable-side engaging portion (upper-side J hook 40) are hookingly engaged with each other by the input action of the large load in the detaching direction. With this configuration, the large load in the detaching direction that is input to the fixed-side engaging portion (lower-side J hook 30) from the movable-side engaging portion (upper-side J hook 40) can be reliably received without loss by a hooking structure between the hook portions (hook portions 32, 43) of both engaging portions.

The movable-side engaging portion (upper-side J hook 40) is attached to a bracket (anchor bracket 20) that is attached to the movable-side rail (upper rail 12). With this configuration, the movable-side engaging portion (upper-side J hook 40) can be attached to the bracket (anchor bracket 20) attached to the movable-side rail (upper rail 12) after loosely hooking the movable-side engaging portion (upper-side J hook 40) to the fixed-side engaging portion (lower-side J hook 30), so that it is possible to improve the ease of assembly. Further, it is possible to provide a high-versatility configuration such that the movable-side engaging portion (upper-side J hook 40) and the bracket (anchor bracket 20) are individually replaceable.

The slide rail (slide rail 10) is configured to couple a vehicle seat (seat 1) so as to be slidable in a vehicle longitudinal direction with respect to a vehicle floor (floor F) as the vehicle body. The fixed-side engaging portion (lower-side J hook 30) is attached to a rear end portion of the fixed-side rail (lower rail 11). The contact surface (lower surface 32L) is configured such that a rear-side surface region (rear-side surface region 32B) is formed at a position lower than a front-side surface region (front-side surface region 32A). The movable-side engaging portion (upper-side J hook 40) is configured to receive the input of the large load in the detaching direction from a seat belt anchor (seat belt anchor SBA).

Since the fixed-side engaging portion (lower-side J hook 30) is attached to the rear end portion of the fixed-side rail (lower rail 11), when a front collision of the vehicle occurs in the state where the movable-side rail (upper rail 12) is located near a rearmost position, the large load in the detaching direction is input to the fixed-side engaging portion (lower-side J hook 30) from the seat belt anchor (seat belt anchor SBA) via the movable-side engaging portion (upper-side J hook 40). In this event, since the contact surface (lower surface 32L) of the fixed-side engaging portion (lower-side J hook 30) has the shape such that the rear-side surface region (rear-side surface region 32B) is lower than the front-side surface region (front-side surface region 32A), even if either of the surface regions is deformed to a raised shape depending on a slide position of the movable-side rail (upper rail 12), the movable-side engaging portion (upper-side J hook 40) tends to be held in a state in which the movable-side engaging portion (upper-side J hook 40) can slide forward. Therefore, it is possible to slide the movable-side rail (upper rail 12) forward after the occurrence of the collision so as to properly enlarge an entrance/exit opening for a rear seat.

While the mode for carrying out the disclosure has been described with reference to one embodiment, the disclosure can be carried out in various modes in addition to the above-described embodiment. For example, the slide rail of the disclosure may be one that slidably couples to a vehicle body such as a vehicle floor, a seat other than left seats of automobiles, a seat that is applied to vehicles other than automobiles, such as railway vehicles, or a seat that is offered for various vehicles such as airplanes and ships.

The slide rail may be one that couples a vehicle seat to a vehicle body so as to be slidable in a vehicle width direction with respect to the vehicle body. The slide rail may be one that is used lying sideways with its fixed-side rail attached to a side wall of a vehicle. As an example used in such a way, there can be cited a slide rail, disclosed in a document such as Japanese Patent Application Publication No. 2010-274738 (JP 2010-274738 A), that is used for coupling a seat back (vehicle seat) to a vehicle side wall (vehicle body) in a state in which the backrest angle can be adjusted. The slide rail is not limited to the electric type shown in the embodiment, and may be of the manual type that adjusts the position of a seat in a vehicle longitudinal direction by manually switching between lock and release.

The configuration of the disclosure is satisfactory if a contact surface, that comes in contact with a movable-side engaging portion, of a fixed-side engaging portion has a shape such that surface regions having mutually different height positions in a detaching direction are provided side by side in a sliding direction. The surface region having the relatively low height position may be formed in either region in the sliding direction. The surface regions, having the mutually different height positions in the detaching direction, of the contact surface of the fixed-side engaging portion may be connected to each other via a curved surface or a stepwise stepped surface. Alternatively, the surface regions having the mutually different height positions may be connected directly to each other, i.e. not via the connecting surface described above, with a step formed therebetween. The surface regions having the mutually different height positions may have, other than a surface shape being perpendicular to the detaching direction, one of various other surface shapes such as an inclined surface shape, a curved surface shape, and a stepped surface shape.

The fixed-side engaging portion and the movable-side engaging portion are not limited to the configuration in which, at the time of an input of a large load, hook portions respectively formed at distal end portions thereof are hooked to each other to receive the load. Alternatively, the fixed-side engaging portion and the movable-side engaging portion may be configured to receive the load by simply abutting their surfaces against each other in a detaching direction, or may be configured to receive the load by fitting convex and concave shapes, formed therebetween, to each other. Various other configurations may alternatively be applied thereto. The movable-side engaging portion may be formed by another functional component such as an anchor bracket that is attached to a movable-side rail. The fixed-side engaging portion may also be formed by another functional component that is attached to a fixed-side rail.

A seat belt anchor that applies a large load in a detaching direction between a movable-side rail and a fixed-side rail in the event of a front collision of a vehicle may be a buckle which is disposed on the inner side in a vehicle width direction and into which a tongue plate of a seat belt is inserted, may be a lower anchor that is disposed on the outer side in a vehicle width direction for fixing a pulled-out end portion of a seat belt, or may be both.

What is claimed is:

1. A slide rail comprising:
   a fixed-side rail that is attached to a vehicle body;
   a movable-side rail that is slidably attached to the fixed-side rail; and
   a reinforcing structure that is configured to prevent detachment of the movable-side rail from the fixed-side rail,
   wherein the reinforcing structure includes a fixed-side engaging portion that is attached to the fixed-side rail, and a movable-side engaging portion that is attached to the movable-side rail, and the fixed-side engaging portion and the movable-side engaging portion are configured, while allowing sliding of the movable-side rail, to come in contact with each other due to an action by a large load in a detaching direction in which the movable-side engaging portion is raised that is input between the fixed-side rail and the movable-side rail, and to be engaged with each other to restrict movement of the movable-side rail in the detaching direction,
   wherein a contact surface, that comes in contact with the movable-side engaging portion, of the fixed-side engaging portion includes surface regions, the surface regions having mutually different height positions in the detaching direction and being provided side by side in a sliding direction,
   wherein the fixed-side engaging portion and the moveable-side engaging portion are configured such that distal end portions of the fixed-side engaging portion and the moveable-side engaging portion are hookingly engaged with each other by the input action of the large load in the detaching direction,
   wherein the distal end portion of the movable-side engaging portion is disposed at a position lower than the distal end portion of the fixed-side engaging portion,
   wherein the contact surface is configured such that a rear-side surface region of the contact surface is disposed at a position lower than a front-side surface region of the contact surface,
   wherein the front-side surface region of the contact surface and the rear-side surface region of the contact surface are continuously connected to each other via an inclined surface, and
   wherein the fixed-side engaging portion is bent at a position between the front-side surface region and the inclined surface, and the fixed-side engaging portion is bent at a position between the inclined surface and the rear-side surface region.

2. The slide rail according to claim 1,
   wherein the surface regions, having mutually different height positions in the detaching direction, of the contact surface are respectively surfaces each being perpendicular to the detaching direction.

3. The slide rail according to claim 1,
   wherein the fixed-side engaging portion and the movable-side engaging portion are configured as hook portions respectively formed at distal end portions of the fixed-side engaging portion and the movable-side engaging portion.

4. The slide rail according to claim 1,
   wherein the movable-side engaging portion is attached to a bracket that is attached to the movable-side rail and that is configured to be attached with a seat belt anchor.

5. The slide rail according to claim 1,
   wherein the slide rail is configured to couple a vehicle seat so as to be slidable in a vehicle longitudinal direction with respect to a vehicle floor as the vehicle body,
   wherein the fixed-side engaging portion is attached to a rear end portion of the fixed-side rail, and
   the movable-side engaging portion is configured to receive an input of the large load in the detaching direction from a seat belt anchor.

* * * * *